United States Patent [19]

Kolts et al.

[11] Patent Number: 4,943,550

[45] Date of Patent: Jul. 24, 1990

[54] CATALYSTS FOR OXIDATION OF CARBON MONOXIDE

[75] Inventors: John H. Kolts, Ochelata; Scott H. Brown, Bartlesville; Patricia A. Tooley, Bartlesville, all of Okla.

[73] Assignee: Phillips Petroleum Company, Bartlesville, Okla.

[21] Appl. No.: 366,946

[22] Filed: Jun. 14, 1989

[51] Int. Cl.$^5$ .................... B01J 21/04; B01J 21/10; B01J 23/89
[52] U.S. Cl. .................... 502/327; 423/213.5
[58] Field of Search ............... 502/326, 327, 328, 334

[56] References Cited

U.S. PATENT DOCUMENTS

| | | | |
|---|---|---|---|
| 3,639,432 | 1/1987 | Holt et al. | 502/324 |
| 4,012,485 | 3/1977 | Meguerian et al. | 423/213.5 |
| 4,048,098 | 9/1977 | Koberstein et al. | 252/432 |
| 4,111,848 | 9/1978 | Torii et al. | 252/466 PT |
| 4,239,656 | 12/1980 | Fujitani et al. | 252/462 |
| 4,350,613 | 9/1982 | Nishino et al. | 252/455 R |
| 4,492,769 | 1/1985 | Blanchard et al. | 502/262 |
| 4,492,770 | 1/1985 | Blanchard et al. | 502/304 |
| 4,621,071 | 11/1986 | Blanchard et al. | 502/327 X |
| 4,808,394 | 2/1989 | Kolts et al. | 423/437 |
| 4,818,745 | 4/1989 | Kolts | 502/327 |

FOREIGN PATENT DOCUMENTS 1116585 6/1968 United Kingdom .

*Primary Examiner*—W. J. Shine
*Attorney, Agent, or Firm*—K. K. Brandes

[57] ABSTRACT

In a process for preparing a reduced material comprising (a) alumina and/or magnesium aluminate as support material, (b) platinum metal and (c) an iron component, the improvement comprises: (1) treating the reduced composition of matter with an acidic liquid; (2) heating the acid-treated material, and (3) treating the material obtained in step (2) with a reducing gas. The prepared material is used as a catalyst for converting CO and $O_2$ to $CO_2$.

20 Claims, No Drawings

CATALYSTS FOR OXIDATION OF CARBON MONOXIDE

BACKGROUND OF THE INVENTION

This invention relates to the catalytic oxidation of carbon monoxide. In another aspect, this invention relates to effective CO oxidation catalyst compositions. In still another aspect, this invention relates to a process for preparing CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, in tobacco products so as to minimize CO in tobacco smoke, and in $CO_2$ lasers so as to recombine CO and $O_2$ formed by dissociation of $CO_2$ during discharge. In the latter application, the presence of $O_2$ is most undesirable because it can cause a breakdown of the electrical field in the laser cavity. Several patents, e.g., U.S. Pat. No. 4,639,432, disclose compositions useful as CO oxidation catalysts in $CO_2$ laser applications. A particularly effective CO oxidation catalyst composition is described in U.S. Pat. No. 4,818,745, the entire disclosure of which is herein incorporated by reference. However, there is an ever present need to develop new, effective CO oxidation catalyst compositions and/or improved processes for preparing effective CO oxidation catalyst compositions.

SUMMARY OF THE INVENTION

It is an object of this invention to provide a process for preparing a composition of matter which is effective as a catalyst for the oxidation of carbon monoxide with free oxygen. It is another object of this invention to provide a composition of matter which is effective as a CO oxidation catalyst. It is a further object of this invention to provide an effective process for catalytically oxidizing carbon monoxide with free oxygen. Other objects and advantages will be apparent from the detailed description and the claims.

In accordance with this invention, in a process for preparing a composition of matter (which is effective as a catalyst composition for the reaction of carbon monoxide with free oxygen to carbon dioxide) comprising (preferably consisting essentially of) (a) a support material selected from the group consisting of alumina, magnesium aluminate and mixtures thereof, (b) platinum metal, and (c) an iron component selected from the group consisting of iron metal, iron oxides and mixtures (preferably iron oxide), wherein said composition of matter has undergone a reducing treatment (preferably with $H_2$ and/or CO), the improvement comprises:

(1) treating the composition of matter which has undergone a reducing treatment with an acidic liquid (preferably an aqueous acid solution);

(2) heating the material obtained in step (1) under such conditions as to substantially remove said acidic liquid from said material obtained in step (1); and (3) treating the material obtained in step (2) with a reducing gas (preferably $H_2$ and/or CO) under such conditions as to enhance the activity of said material for catalyzing the reaction of carbon monoxide with free oxygen to carbon dioxide (in particular, when this reaction of CO with $O_2$ is carried out at a temperature of about 10°-50° C.).

In one preferred embodiment, the acidic compound used in step (1) is an aqueous solution. In another preferred embodiment, heating step (2) is carried out at a temperature high enough for a period of time long enough (more preferably at about 80°-700° C. for about 0.5-20 hours) to substantially decompose iron compounds which have been formed with the acidic liquid in step (1) to at least one iron oxide. In a further preferred embodiment, the reducing treatment of step (3) is carried out at a temperature of at least about 20° C. for at least one minute (more preferably at about 20°-600° C. for about 0.5-20 hours).

Also in accordance with this invention, a process for the oxidation of carbon monoxide with free oxygen to carbon dioxide employs as catalyst the above-described composition of matter having undergone steps (1), (2) and (3). Preferably, the CO oxidation process is carried out at a temperature below about 400° C. (more preferably at about −50° to about 400° C.).

Further in accordance with this invention, a composition of matter is provided having been prepared by the above-described preparation process comprising steps (1), (2) and (3).

DETAILED DESCRIPTION OF THE INVENTION

Any alumina and/or magnesium aluminate can be used as the support material for the composition of matter of this invention. Presently preferred are substantially pure alumina (aluminum oxide) and/or magnesium aluminate spinel. More preferably, the support material contains at least about 95 weight percent $Al_2O_3$ or Mg aluminate. These support materials are commercially available.

The method of preparation of alumina is not considered critical. Generally, first hydroxides and/or hydrated oxides of aluminum are precipitated from an aqueous solution of a dissolved aluminum compound by means of a suitable alkaline substance (e.g., aqueous $NH_3$). Then the precipitate is separated, washed, and finally heated so as to remove water therefrom and to convert aluminum hydroxide to aluminum oxide.

The preparation of magnesium aluminate spinel, having the approximate chemical formula of $MgAl_2O_4$ is not considered critical. In a preferred embodiment, Mg aluminate is prepared by ball-milling alumina powder and magnesia powder aT an appropriate weight ratio, molding the mixture into a desired shape (e.g., spherical), drying, and calcining (e.g., at about 1350° C. for 10 hours), as has been described in Examples 1–5 of U.S. Pat. No. 4,239,656, the disclosure of which is herein incorporated by reference.

Generally the surface area (determined by the BET/$N_2$ method; ASTM D3037) of alumina and magnesium aluminate (or mixtures thereof) is in the range of from about 10 to about 350 $m^2$/g. Alumina and/or Mg aluminate can have spherical, cylindrical, trilobal, quadrilobal, ring-like or irregular shapes. When spheres are used, their diameter generally is in the range of from about 0.2 to about 20 mm, preferably about 1–5 mm.

It is within the scope of this invention to prepare suitable support materials by coating an inert porous ceramic material, such as a monolith (commercially available from Corning Glass Works, Corning, N.Y.; described in U.S. Pat. Nos. 4,388,277 and 4,524,051) with alumina and/or Mg aluminate. The monolith can be impregnated with an organic compound of Al (such as trialkyl Al), hydrolyzed, dried, and calcined to form alumina-coated monolith. Or the monolith can be impregnated with a dispersion (preferably colloidal) of Al oxide/hydroxide, followed by drying and calcining. When a magnesium aluminate-coated monolith is to be formed, the monolith can be impregnated with organic compounds of Mg and Al or with a dispersion of oxides/hydroxides of Mg and Al, followed by drying and calcining at a temperature high enough to form Mg aluminate-coated monolith.

The impregnation of the support material with Pt and Fe can be carried out in any suitable manner. Generally, compounds of Pt and of Fe are dissolved in a suitable solvent (preferably water) so as to prepare solutions of suitable concentration, generally containing from about 0.005 to about 0.40 g Pt per cc solution and about 0.005 to about 0.40 g Fe per cc of solution. Non-limiting examples of suitable Pt compounds are nitrates or organic compounds of platinum, such as carboxylates or acetylacetonates of Pt, preferably $Pt(NH_3)_4(NO_3)_2$. Non-limiting examples of suitable Fe compounds are: $Fe(NO_3)_2$, $Fe(NO_3)_3$ (preferred), Fe carboxylates, Fe acetylacetonate, and the like. It is understood that organic solvents, such as methanol, ethanol, acetone, ethyl acetate, toluene and the like, can be used as solvents for organic compounds of Pt and Fe.

The support material is impregnated by soaking it in the solution of Pt and Fe compounds; or (less preferably) the Pt and Fe containing solution is sprayed onto the support material. The ratio of Pt and Fe solution to support material generally is such that the final composition of matter of this invention contains about 0.1 to about 10 weight percent Pt, preferably about 0.5 to about 5 weight percent Pt, and about 0.05 to about 20 weight percent Fe, preferably about 0.1 to about 4 weight percent Fe. However, it is within the scope of this invention to have components (b) and (c) present at any weight percentage such that (c) acts as a copromoter for (B) in the oxidation of CO with $O_2$, in particular at about 10°–50° C. Even though it is presently preferred to simultaneously impregnate the support material with dissolved compounds of Pt and Fe, the impregnation (or spraying) of the support material can also be carried out sequentially (first Fe, then Pt, or vice versa).

Heating of the Pt/Fe-impregnated material is generally carried out in an inert or oxidizing atmosphere, preferably a free oxygen containing gas atmosphere (such as air), generally at a temperature ranging from about 80° to about 700° C. Preferably, heating is carried out in two sequential sub-steps: first at about 80° to about 200° C. (preferably at about 80°–130° C.), generally for about 0.5 to about 10 hours, so as to substantially dry the Pt/Fe-impregnated material (preferably under such conditions as to reduce the level of adhered and occluded water to less than about 10 weight percent); and then at about 250° to about 700° C. (preferably about 400° to about 600° C.), generally for about 0.5 to about 10 hours, under such conditions as to substantially calcine the impregnated support material so as to obtain at least one Pt oxide, optionally mixed with metallic Pt, and at least one Fe oxide on alumina and/or Mg aluminate.

Reducing of the calcined, Pt/Fe-impregnated material can be carried out in any suitable manner, preferably at a temperature in the range of from about 20° to about 650° C., more preferably from about 200° to about 500° C. Any reducing gas can be employed, such as a gas comprising $H_2$, CO, gaseous hydrocarbons such as methane, mixtures of the above, and the like. Preferably, a free hydrogen containing gas, more preferably a gas stream of substantially pure $H_2$, is employed. The reducing step can be carried out for any suitable period of time, generally at least about 1 minute, preferably from about 0.5 to about 20 hours, more preferably about 1-5 hours. During the reducing treatment, platinum oxide is generally substantially reduced to platinum metal; whereas, it is believed that either substantially no reduction of iron oxide to iron metal occurs or that only a minor portion of iron oxide is reduced to metallic iron.

Step (1) of the improvement process of this invention can be carried out in any suitable manner. Any suitable inorganic or organic acid having a pH of less than about 7 can be used in step (1). Preferably, an aqueous solution of nitric acid or of a carboxylic acid (more preferably acetic acid) is used as acidic liquid. However, it is within the scope of this invention to use substantially water-free glacial acetic acid for acid-treatment step (1). Suitable concentrations for the two preferred acidic liquids are: about 0.01-15 mole/l of $HNO_3$, and about 0.1-18 mole/l of acetic acid. The previously reduced Pt/Fe-containing material (described above) is soaked in step (1) with the acidic liquid (generally at a temperature of about 10°–80° C.) for a suitable period of time (generally for about 0.01-1 hour), preferably with sufficient liquid to attain incipient wetness (i.e., just enough liquid to fill all the pores of the supported Pt/Fe oxide material).

Step (2) of the improvement process of this invention can be carried out by any suitable means which result in the substantial removal of the acid and solvent (in particular water) from the material obtained in step (1). Furthermore, in step (2) substantially all compounds of Fe which have been formed by reaction of iron oxide or metal with the acid in step (1) are converted to iron oxide, i.e., one or a plurality of oxides of Fe. In addition, in step (2) any platinum compounds which may have been formed in step (1) will be substantially decomposed to platinum oxide, optionally admixed with Pt metal. Preferably, step (2) is carried out in an inert or oxidizing atmosphere, preferably a free oxygen containing gas (such as air), generally at a temperature in the range of from about 80° to about 700° C. Preferably, step (2) is carried out in two sequential sub-steps: first at about 80°–200° C. (preferably about 80°–130° C.) for about 0.3-10 hours, so as to substantially dry the material obtained in step (1), and thereafter heating the substantially dried material at about 250°–700° C. (preferably about 400°–600° C.), generally for about 0.2-10 hours, so as to obtain platinum oxides optionally admixed with Pt metal, and iron oxide on alumina and/or Mg aluminate support.

Reducing step (3) can be carried out in any suitable manner, preferably at a temperature of about 20°–650° C. (more preferably about 200°–500° C.) for about 0.5-20 hours (preferably about 1-5 hours), so as to enhance the activity of the composition of matter for catalyzing low temperature CO oxidation with $O_2$, i.e., to enhance the conversion of CO and $O_2$, to $CO_2$ in a test carried out at about 10°–50° C., as compared with the material obtained in step (2). In addition, the produced material obtained in step (3) has a higher CO oxidation activity than the reduced material used as starting material in step (1). Any reducing gas can be used in step (3): $H_2$, CO, paraffins such as $CH_4$, and the like, and mixtures thereof. Preferably, a stream comprising $H_2$ or preferably a stream of substantially pure $H_2$, is employed in step (3). In reducing step (3), substantially all platinum oxide is reduced to platinum metal;

whereas, it is believed that either substantially no reduction of iron oxide to iron metal occurs (especially at relatively low reducing temperatures) or that only a minor portion of iron oxide is reduced to iron metal (especially at higher reducing temperatures). Thus, substantially all or a major portion of the iron component remains in the oxidic form in the final composition of matter of this invention. The material obtained in step (3) comprises, preferably consists essentially of, components (a), (b) and (c), as defined above, at weight percentages described above.

The process for oxidizing a carbon monoxide containing feed gas can be carried out at any suitable temperature and pressure conditions, for any suitable length of time, at any suitable gas hourly space velocity, and any suitable volume ratio of CO and $O_2$. The reaction temperature generally is in the range of from about $-50°$ to about $400°$ C., preferably from about $-30°$ to about $170°$ C., more preferably from about $10°$ to about $50°$ C. The pressure during the oxidation process generally is in the range of from about 0.1 to about 2,000 psia, preferably from about 5 to about 20 psia. The volume ratio of CO to $O_2$ in the feed gas can range from about 1:100 to about 100:1, and preferably is in the range of from about 1:10 to about 10:1. The volume percentage of CO and the volume percentage of $O_2$ in the feed gas can each be in the range of from about 0.05 to about 50, preferably from about 0.05 to about 3. The gas hourly space velocity (cc feed gas per cc catalyst per hour) can be in the range of from about 1 to about 200,000, preferably from about 100 to about 50,000. It is understood that the calculation of the gas hourly space velocity is based on the volume of the active catalyst, i.e., the alumina and/or Mg aluminate supported Pt/Fe oxide catalyst, excluding the volume occupied by any additional inert support material, such as a monolith, which may be present.

The feed gas can be formed in any suitable manner, e.g., by mixing CO, $O_2$ and, optionally, other gases such as $CO_2$, $N_2$, He and the like, such as in a carbon dioxide laser cavity. The feed gas can be an exhaust gas from a combustion engine, or it can be contaminated air or smoke from a cigarette (or cigar or pipe) that is to be inhaled by humans and contains undesirably high levels of toxic carbon monoxide, and the like. The feed gas can be contacted in any suitable vessel or apparatus, such as in a laser cavity, or in an exhaust pipe of a combustion engine, or in a gas mask (used by humans), or in a smoking article (cigarette, cigar, pipe), wherein the feed gas passes over the catalyst composition of this invention at the conditions described above. The CO oxidation process of this invention can be carried out in any suitable setting and for any purpose, e.g., to recombine CO and $O_2$ in $CO_2$ lasers, to oxidize CO contained in exhaust gases or in air, to make isotopically labeled $CO_2$ from CO and the $_8{}^{18}O$ isotope, and the like.

The following examples are presented in further illustration of the invention and are not to be construed as unduly limiting the scope of the invention.

EXAMPLE I

This example illustrates the preparation of various alumina-supported Pt/Fe catalysts and their evaluation for low temperature CO oxidation activity.

A 5.5 gram sample of a commercial catalyst material (provided by General Motors Corp., Detroit, Michigan) containing 0.1 weight percent Pt on alumina was sequentially impregnated several times with 7.8 grams of an aqueous solution of dissolved $Pt(NH_3)_4(NO_3)_2$ and $Fe(NO_3)_3$ comprising about 0.02 g Pt/g solution and about 0.01 g Fe/g solution. Between successive impregnations, the material was dried at about $125°$ C. The impregnation was continued until the solid material contained about 3 weight percent Pt and about 1.5 weight percent Fe. The thus-impregnated material was calcined in air at about $400°$ C. for about 3 hours. This calcined material is labeled Catalyst A.

Catalyst B was prepared by reducing Catalyst A with $H_2$ at about $500°$ C. for about 1 hour.

Catalyst C was prepared by multiple impregnations of about 1 gram of Catalyst A (unreduced) with 2.5 grams of concentrated $HNO_3$ at room temperature and drying at $125°$ C. after each acid impregnation step, followed by calcining in air at about $400°$ C. for about 3 hours, and a final reduction step with $H_2$ at about $500°$ C. for about 1 hour.

Catalyst D was prepared by subjecting Catalyst A to multiple reducing treatments with $H_2$ at $500°$ C. (for a total time of about 2.5 hours), followed by multiple acid treatments with 2.5 grams of concentrated $HNO_3$, drying between each acid impregnation, calcination in air at $400°$ C. for about 3 hours, and reduction with $H_2$ at about $500°$ C. for about 1 hour.

Catalysts B, C and D were tested for CO oxidation activity. A gaseous feed comprising 1.2 volume percent CO, 0.6 volume percent $O_2$, 32 volume percent $CO_2$, 32 volume percent He and $N_2$ as the remainder was passed through a needle valve and a glass reactor tube of 6 mm inner diameter in an upflow direction. The glass reactor contained 1.0 gram of Catalyst B or C or D in a bed of about 2 cm height. The temperature in the catalyst bed was measured by means of a thermocouple inserted into the top layer of the catalyst bed. The CO content of the reactor effluent was determined by means of a Series 400 Anarad IR analyzer.

All tests were carried out at ambient conditions (about $25°–30°$ C., 1 atm.) and a flow rate of the feed gas of 400 cc per minute per gram catalyst. Test results are summarized in Table I

TABLE I

| Hours on Stream | Cubic Centimeter CO Converted Per Minute Per Gram Catalyst | | |
|---|---|---|---|
| | Catalyst B | Catalyst C | Catalyst D |
| 0.5 | 1.58 | 2.63 | — |
| 1 | 1.22 | 2.29 | — |
| 2 | 0.99 | 1.95 | — |
| 3 | 0.81 | 1.80 | — |
| 4 | 0.72 | | |
| | re-reduced w. $H_2$ at $500°$ C., 0.5 hr. | re-reduced w. $H_2$ at $500°$ C., 0.75 hr. | |
| 0.5 | 2.78 | 3.23 | 2.67 |
| 1 | 2.34 | 2.72 | 2.61 |
| 2 | 1.99 | 2.28 | 2.61 |
| 3 | 1.80 | 2.04 | 2.62 |
| 4 | 1.64 | 1.89 | 2.61 |
| 5 | 1.51 | 1.78 | 2.58 |
| 6 | 1.38 | 1.68 | 2.55 |
| 8 | 1.18 | 1.49 | 2.48 |
| 10 | 1.04 | 1.31 | 2.41 |
| 12 | 0.91 | 1.18 | 2.32 |
| 14 | 0.83 | 1.08 | 2.29 |
| 16 | — | 1.07 | 2.27 |

NOTE:
Percent CO conversion data can be calculated by multiplying the data in TABLE I (i.e., cc CO/minute/gram) by a factor of about 20.8.

Test data in Table I clearly show that Catalyst D (acid-treated after reduction) lost only about 14% of its initial activity during a 14-hour time period, whereas the relative activity decrease of control Catalysts B and C was 70% and 67%, respectively, during the same time period. Thus, the catalyst which was prepared in accordance with the method of this invention exhibited a much higher catalyst life and will be more suitable in extended applications, e.g., in $CO_2$-filled lasers and the like, than catalysts which had not been acid-treated (Catalyst B) or was acid-treated before the first reduction step (Catalyst C).

EXAMPLE II

This example provides additional test results on the effect of acid treatment of reduced $Pt/Fe/Al_2O$ catalysts on CO oxidation activity.

Commercial alumina spheres (⅛-inch diameter; not containing Pt; provided by Aluminum Company of America, Pittsburg, Pa.) were impregnated with dissolved compounds of Pt and Fe, dried and calcined, substantially in accordance with the procedure described in Example I; This material, labeled Catalyst E, contained 3 weight percent Pt and 1.5 weight percent Fe (as iron oxide).

Catalyst F was prepared by heating Catalyst E in hydrogen gas at 300° C. for 3 hours.

Catalyst G was prepared by impregnating Catalyst F using nitric acid, drying, calcining in air, and heating again in hydrogen gas at 300° C. for 3 hours, substantially as described in Example I.

Both catalysts were tested in accordance with the CO oxidation procedure described in Example I. The CO conversion attained with Catalyst F decreased from about 89% (4.3 cc CO/minute/g catalyst) after 1 hour on stream to about 43% (2.1 cc CO/minute/g catalyst) after 18 hours on stream, whereas the CO conversion attained with Catalyst G decreased from about 96% (4.6 cc CO/minute/g catalyst) after 1 hour on stream to about 53% (2.5 cc CO/minute/g catalyst) after 18 hours on stream. These test results demonstrate the superiority of invention Catalyst G.

In another test series, alumina spheres (⅛ inch diameter) were impregnated with dissolved compounds of Pt and Fe, dried and calcined, substantially as described above. This material, labeled Catalyst H, contained 2 weight percent Pt and 1 weight percent Fe (as iron oxide).

Catalyst I was prepared by reducing Catalyst H with $H_2$ gas at 300° C. for 3 hours, followed by soaking twice with glacial acetic acid, drying, calcining, and reducing in $H_2$ gas, as described above.

The CO conversion attained with Catalyst I in a CO oxidation test, in accordance with the procedure of Example I, was about 90% (4.3 cc CO/minute/g catalyst) after 1 hour on stream, and about 57% (2.7 cc CO/minute/g catalyst) after about 22 hours on stream. This example illustrates that acids other than nitric acid can be used in preparing the CO oxidation catalyst of the invention.

EXAMPLE III

This example illustrates the preparation of magnesium aluminate supported Pt/Fe catalysts and their performance in low temperature CO oxidation tests.

⅛-inch magnesium aluminate rings (provided by Haldar-Topso, Inc.; Houston, Tex.) were impregnated with compounds of Pt and Fe (by multiple impregnations and drying steps between impregnations), dried and calcined, substantially in accordance with the procedure described in Example 1. This calcined material, labeled Catalyst J, contained 3.0 weight percent Pt and 1.5 weight percent Fe (as iron oxide).

Catalyst K was prepared by reducing Catalyst J with $H_2$ gas at 300° C. for 3 hours.

Catalyst L was prepared by impregnating Catalyst K with nitric acid, drying, calcining and re-reducing (at 300° C./3 hours), substantially in accordance with the procedure of Example I.

Catalysts K and L were tested in a CO oxidation test, in accordance with the procedure described in Example 1. The CO conversion attained with Catalyst K was about 43% (1.0 cc CO/minute/g catalyst) after 1 hour on stream, and about 25% (0.6 cc CO/g catalyst/minute) after 22 hours on stream. The CO conversion attained with invention Catalyst L was about 61% (1.4 cc CO/minute/g catalyst) after 1 hour on stream, and about 39% (0.9 cc CO/minute/g catalyst) after 22 hours on stream. These test results clearly demonstrate the superiority of the Hg aluminate supported catalyst which had been prepared in accordance with the method of this invention (comprising acid treatment after reduction).

Reasonable variations, modifications and adaptations for various conditions and uses can be made within the scope of the disclosure and appended claims.

That which is claimed is:

1. In a process for preparing a composition of matter comprising (a) a support material selected from the group consisting of alumina, magnesium aluminate and mixtures thereof, (b) platinum metal, and (c) an iron component selected from the group consisting of iron oxides, iron metal and mixtures thereof, wherein said composition of matter has undergone a reducing treatment, the improvement which comprises:
   (1) treating said composition of matter, which has undergone a reducing treatment, with an acidic liquid;
   (2) heating the material obtained in step (1) under such conditions as to substantially remove said acidic liquid from said material obtained in step (1); and
   (3) treating the material obtained in step (2) with a reducing gas under such conditions as to enhance the activity of said material for catalyzing the reaction of carbon monoxide with free oxygen to carbon dioxide.

2. A process in accordance with claim 1, wherein said composition of matter comprises about 0.1 to about 10 weight-% Pt and about 0.05 to about 20 weight-% Fe.

3. A process in accordance with claim 2, wherein said support material is alumina.

4. A process in accordance with claim 2, wherein said support material is magnesium aluminate.

5. A process in accordance with claim 1, wherein said iron component consists essentially of iron oxide.

6. A process in accordance with claim 1, wherein said acidic liquid used in step (1) is selected from the group consisting of aqueous solutions of nitric acid and glacial acetic acid.

7. A process in accordance with claim 1, wherein step (1) is carried out at about 10°–80° C. for about 0.01–1 hour.

8. A process in accordance with claim 1, wherein step (2) is carried out at a temperature in the range of from about 80° to about 700° C.

9. A process in accordance with claim 8, wherein step (2) is carried out in two sub-steps: first substantially drying the material obtained in step (1) at a temperature of about 80°–200° C. for about 0.3–10 hours, and thereafter heating the substantially dried material at about 250°–700° C. for about 0.2–10 hours.

10. A process in accordance with claim 1, wherein said reducing gas used in step (3) is hydrogen.

11. A process in accordance with claim 10, wherein step (3) is carried out at about 20°–650° C. for about 0.5–20 hours.

12. A composition of matter comprising (a) a support material selected from the group consisting of alumina, magnesium aluminate and mixtures thereof, (b) platinum metal and (c) an iron component selected from the group consisting of iron oxide, iron metal and mixtures thereof, said composition of matter having been prepared by the process of claim 1.

13. A composition of matter in accordance with claim 12, wherein said support material is alumina.

14. A composition of matter in accordance with claim 13, comprising about 0.1 to about 10 weight-% Pt and about 0.05 to about 20 weight-% Fe.

15. A composition of matter in accordance with claim 12, wherein said support material is magnesium aluminate.

16. A composition of matter in accordance with claim 15 comprising about 0.1 to about 10 weight-% Pt and about 0.05 to about 20 weight-% Fe.

17. A composition of matter in accordance with claim 12, wherein said support material is a mixture of alumina and magnesium aluminate.

18. A composition of matter in accordance with claim 17 comprising about 0.1 to about 10 weight-% Pt and about 0.05 to about 20 weight-% Fe.

19. A composition in accordance with claim 12, wherein said iron component consists essentially of iron oxide.

20. A composition of matter in accordance with claim 12 consisting essentially of components (a), (b) and (c).

* * * * *